J. E. GRAYBILL.
PROTECTIVE DEVICE.
APPLICATION FILED OCT. 5, 1914.
1,262,582. Patented Apr. 9, 1918.
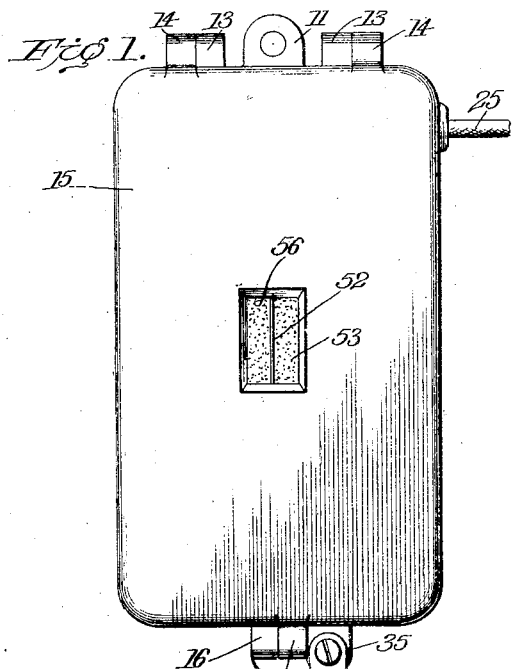
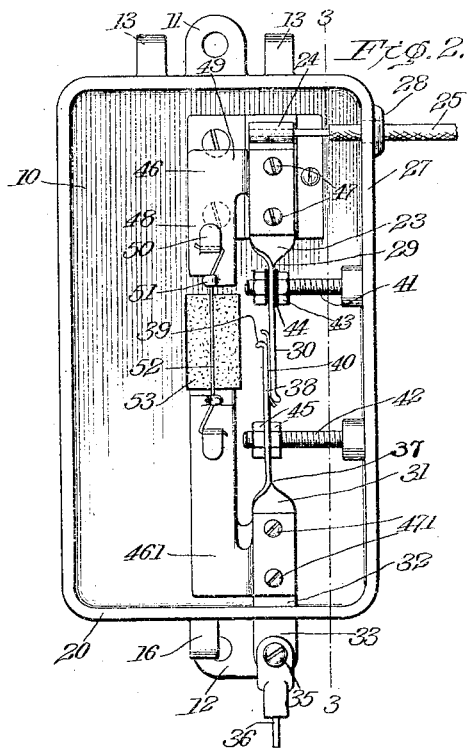
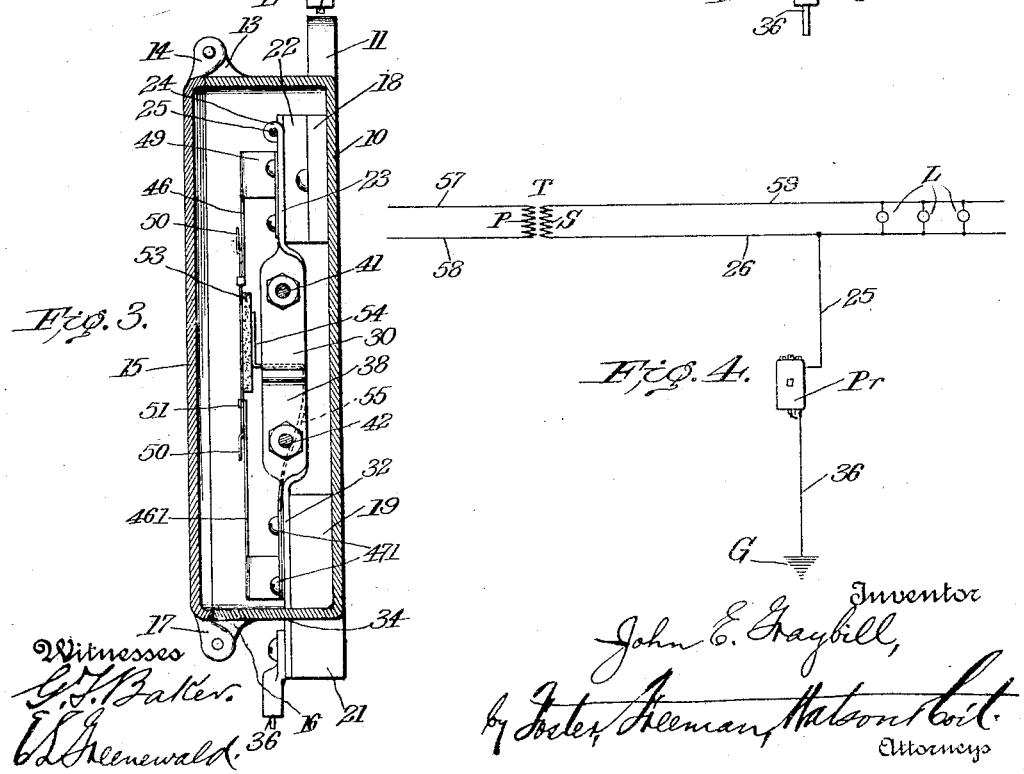

UNITED STATES PATENT OFFICE.

JOHN E. GRAYBILL, OF YORK, PENNSYLVANIA.

PROTECTIVE DEVICE.

1,262,582.   Specification of Letters Patent.   Patented Apr. 9, 1918.

Application filed October 5, 1914.   Serial No. 865,219.

*To all whom it may concern:*

Be it known that I, JOHN E. GRAYBILL, a citizen of the United States, residing at York, county of York, State of Pennsylvania, have invented certain new and useful Improvements in Protective Devices, of which the following is a specification.

My invention relates to protective devices for secondary circuits of electric distribution systems.

Engineers are at variance regarding the proper protection of secondary circuits. Some advocate permanently grounding secondary circuits because it is safer and protects lives, while other engineers are opposed to such an arrangement because a grounded secondary circuit increases the fire hazard as it decreases the effective insulation of the line by one half.

My invention seeks to overcome the objections in both cases by providing a device which will keep the secondary circuit of the transformer grounded when the insulation of the transformer breaks down or when the other side of the line is grounded.

Another object of my invention is to provide a means which will immediately indicate that high voltage has come on to the secondary circuit or that one side of the circuit is grounded, and comprises in the present form a small fuse, blown by excess amperage which accompanies the high voltage.

The above and other objects and novel features of my invention will be apparent from the following description taken in connection with the drawing, in which, Figure 1 is a front elevation of the protective device embodying my invention;

Fig. 2 is a similar view with the cover removed;

Fig. 3 is a longitudinal sectional view of the device taken on the line 3—3 of Fig. 2; and Fig. 4 is a diagrammatic view showing the circuit arrangement when the device is installed.

Referring to the drawing, the casing for the device comprises a rectangular cast iron box 10, which has integral ears 11 and 12 at its opposite ends whereby it may be fastened to a suitable support. At one end above the ear 11 the box is provided with integral lugs 13 whereby it may be hinged to the integral lugs 14 on the end of the cover 15. At the opposite end of the box and above the ear 12 there is an integral lug 16 which has an opening therein that registers with an opening in the integral lug 17 on the end of the cover 15, the registering openings being adapted to receive a wire or other device whereby the cover may be fastened in closed or sealed position on the box.

A block 18 of insulating material is attached to the flat bottom of the box by screws 181 which are disposed on opposite sides of the high central portion 22 of said insulating block. A base 19 also cast integral with the box 10 is located adjacent the lower wall 20 of the box and has a part 21 which extends below the lower wall 20 and is formed integral with the ear 12.

The raised central part 22 which is integral with the block 18 serves to support the clip 23 which constitutes the positive or live end of the grounding means. The clip 23 consists of a strip of copper or other suitable conductor which is rolled at one end as at 24, to which the wire 25 may be soldered. The other end of the wire 25 is connected to the branch 26 of the secondary circuit at any suitable point ahead of the wattmeter but back of the main line cutout. The wire 25 enters the box through an opening in the side wall 27 and is insulated therefrom by a porcelain bushing 28. Intermediate its ends the clip 23 is twisted as at 29 so that the part 30 is disposed at right angles to the part of the clip which is fastened to the insulating block 22.

A second clip 31 is located substantially in line with the first mentioned clip 23 and has its lower end 32 fastened to the base 19 and also has a portion 33 which projects through a slot 34 in the lower wall 20 of the box and rests on the lug 21. The lower end 33 of the clip 31 is provided with a binding screw 35 and lug 351, whereby the ground wire 36 may be connected thereto. The other end of the ground wire 36 leads to some suitable ground connection G.

Intermediate its ends the clip 31 is twisted similarly to the clip 23, as at 37, forming a portion 38 which is disposed at right angles to the portion 32 of the clip, the end of each of the clips being bent out as at 39. The portions 30 and 38 of the two clips overlap and being made of spring material they tend to spring toward each other. A strip of insulating material 40 such as thin paper, which will separate and insulate the parts 30 and 38 from each other under ordinary working conditions, or voltages, say up to 350 volts or a voltage necessary to injure or kill a person, is clamped between the opposing faces of the parts 30 and 38.

In order to adjust the free ends 30 and 38, the parallel threaded studs 41 and 42 are fitted in the side wall 27 and extend through holes in the clips 30 and 38, respectively. The clip 30 is held in a fixed position by means of the nuts 43 fitting the threaded stud 41 and located on opposite sides of the clip and insulated therefrom by the insulating washers 44. The clip 38 is similarly adjustable and capable of being held in fixed positions by the nuts 45 which fit the threaded stud 42 and clamp the clip 38 between them.

It will be seen that the separating or insulating strip 40 prevents the flow of current from the clip 30 to the clip 38 and to ground, but being designed to puncture at a predetermined voltage will ground the circuit the moment an injurious voltage comes on the wire 25.

A fuse holder 46 is held in place on the insulating block 22 by the screws 47 which secure the upper grounding clip to the insulating block. The fuse holder 46 has a lateral portion 48 connected to the fastening device by means of a curved part 49. The lateral part of the fuse holder has tongues 50 and 51 punched therefrom whereby one end of the fuse wire 52 is held in place. The opposite end of the fuse wire 52 is held in place by a fuse holder 461, similar in construction to the fuse holder 46 and fastened to the block 19 which is connected to ground by the wire 36. The ends of the fuse wire are wound beneath the tongues 51 which are located at the ends of the holders 46 and 461 and then beneath the tongues 50 which are disposed at right angles to the tongues 51 and punched upwardly from the body of the holders 46 and 461. The connection between the fuse holders 46 and 461 is made by a length of fuse wire 52 which, if desired, may be designed to blow at a current of say ½ amp. or somewhat before the voltage operates at which the insulating strip 40 breaks down.

In order that it will be possible to readily determine whether the fuse wire 52 has blown, due to high voltage either from breaking down of the insulation of the transformer or a ground on the opposite side of the circuit, I provide a piece of asbestos 53 which rests against the under side of the wire 52 and is attached to a plate 54 at the outer end of a flat spring 55, the inner end of which is supported on and fastened to the block 19. The spring 55 tends to press the piece of asbestos or indicator outwardly and when the fuse 52 fails the indicator 53 is forced against the window 56 in the cover 15. The window 56 is formed by an opening in the cover 15 and may be closed by a suitable piece of transparent material such as glass or mica and when the asbestos indicator 53 is pressed against the window it can be readily seen that the fuse has blown.

From the foregoing description the operation of the device will be apparent. Referring to the diagram shown in Fig. 4, the high tension wires 57 and 58 which supply the primary P of the transformer T are insulated from the secondary S of the transformer which supplies the secondary circuit 26, 59 leading to the translating devices L. The protective device Pr has its positive side connected to the branch 26 by the wire 25 and is connected to ground by the wire 36, and may be located ahead of the meter but back of the main line cutout or it may be positioned on the pole beside the transformer but is preferably positioned in a more accessible place. It will be seen that the device will detect a ground on the opposite side of the circuit and will also indicate when the insulation is broken down on the main ground connection. The pressure between the two clips which hold the insulating strip 40 between them may be adjusted as desired.

While I have shown and described the device in detail it is to be understood that certain changes may be made in the same without departing from the spirit of the invention.

Having thus described the invention what is claimed and desired to be secured by Letters Patent is:

1. In a protective device of the class described, the combination of a pair of clamping members, one of which is adapted to be connected to ground and the other of which is adapted to be connected to an electric circuit, a thin insulating strip clamped between said members and puncturable at a predetermined voltage, and a fusible member connected in shunt with said clamping members.

2. In a protective device of the class described, the combination of a pair of clamping members, one of said members being adapted to be connected to ground and the other being adapted to be connected to an electric circuit, a thin insulating member clamped between the clamping members and puncturable at a predetermined voltage, a fusible member connected in shunt with said clamping members, and indicating means controlled by said fusible member.

3. In a protective device, the combination of a box, a cover for said box having a window therein, a pair of clamping members in said box, means whereby one of said clamping members may be connected to ground, the other clamping member being adapted to be connected to an electric circuit, a thin insulating element clamped between said members and puncturable at a predetermined voltage, a fusible member connected in circuit with said clamping members and a device visible through said window and arranged to indicate when the fusible element has been destroyed.

4. In a device for grounding secondaries of transformers, the combination of a pair of clips twisted intermediate their ends and having flat faces opposed to each other, an insulating strip clamped between said opposed faces, and means for adjusting clamping pressure between said faces.

5. In a device of the class described, the combination of a pair of clips, an insulating strip clamped between said clips, means for adjusting the clamping pressure exerted by said clips, a shunt circuit around said clips including a fuse, and indicating means controlled by said fuse, for the purpose described.

6. In a device of the class described, the combination of a casing, a clip in said casing adapted to be connected to one branch of an electric circuit, a second clip in said casing adapted to be connected to ground, said clips having spring ends, an insulating strip clamped between said spring ends and puncturable at a predetermined voltage, and means for adjusting the pressure between said spring ends and the clamping pressure on said strip, said adjusting means comprising a pair of studs in the casing and nuts fitting said studs and bearing against the spring ends of said clips to hold them in clamping relation.

7. In a device of the class described, the combination of a casing, a pair of clips located within the casing and having spring ends, a shunt circuit around said clips including a fuse, an insulating strip clamped between the spring ends of said clips and puncturable at a predetermined voltage, means for adjusting the clamping pressure exerted by said clips, a cover for said casing having a window therein and a device visible through said window and arranged to indicate when the fuse in said shunt circuit is destroyed.

8. In a device of the class described, the combination of a casing having a part provided with a window, a pair of terminal plates in said casing, a fusible member connecting said terminal plates and having a part disposed opposite said window, a heat resisting and non-conducting element resting against said fusible member and a spring normally pressing said element against the fusible member and toward said window, said spring being arranged to force said member toward the window when the fusible member is destroyed.

In testimony whereof I affix my signature in presence of two witnesses:

JOHN E. GRAYBILL.

Witnesses:
ADA ALLISON,
H. G. WIEST.

Copies of this patent may be obtained for five cents each, by addressing the "Commissioner of Patents, Washington, D. C."